May 20, 1930.  A. J. CAWLEY  1,759,777
PROJECTION SYSTEM
Filed Dec. 15, 1926
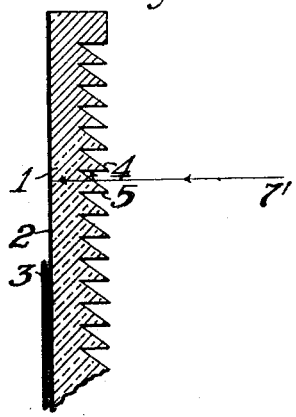
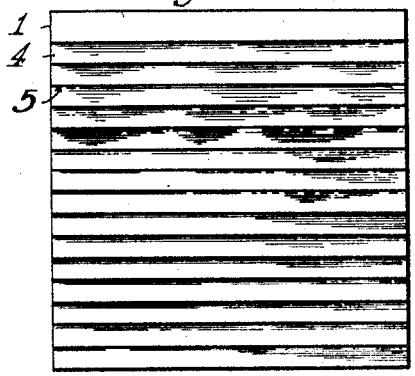
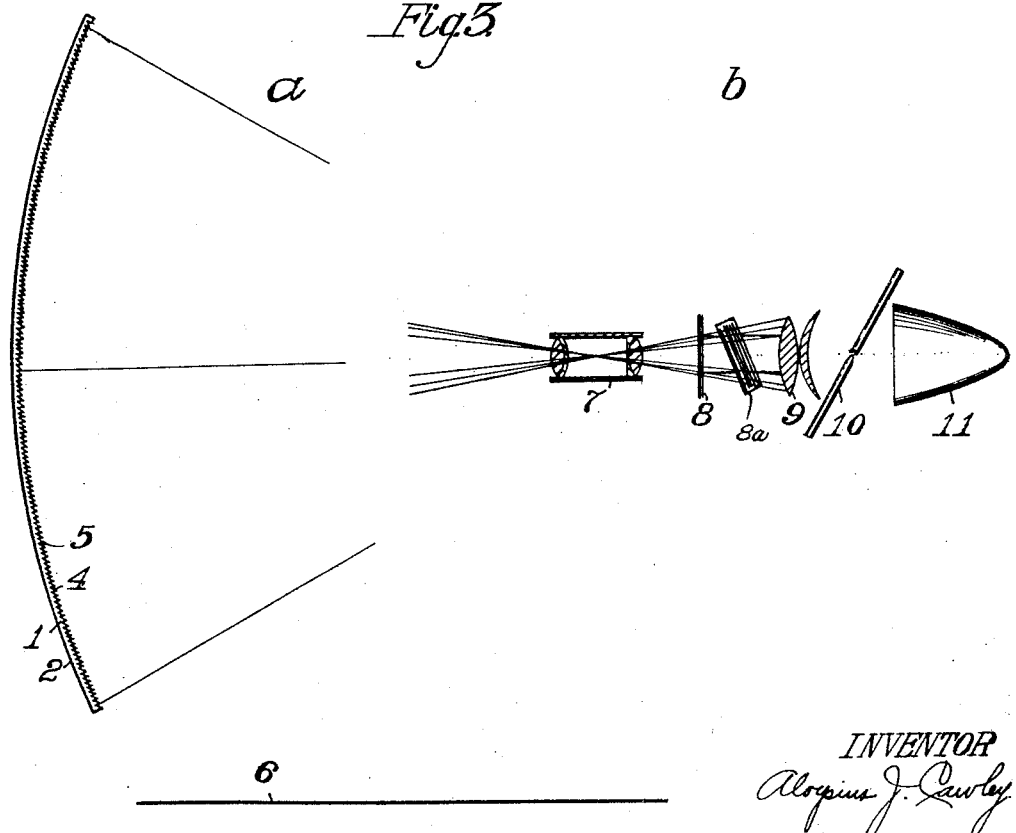
INVENTOR
Aloysius J. Cawley Patented May 20, 1930

1,759,777

UNITED STATES PATENT OFFICE

ALOYSIUS J. CAWLEY, OF PITTSTON, PENNSYLVANIA

PROJECTION SYSTEM

Application filed December 15, 1926. Serial No. 156,097.

The invention relates in general to the production of daylight pictures by means of polarized light in conjunction with suitable projection screens, such screens acting to reflect light which is polarized in a certain predetermined plane.

More particularly, the invention is concerned with the production of a special projection screen having ridges which differ from those heretofore described in that but one surface acts to reflect the suitably polarized light, and further acts to throw this light upon a vertical surface of the adjacent ridge. The vertical surface is provided with light diffusing means, so that there is a diffusing or scattering of the light that comes from the picture. This enables the pictures to be seen with equal brilliancy from all parts of the theatre.

A projection screen is also described which reflects polarized light and by which the picture is viewed by the audience. All other light passes through the screen and is absorbed by proper means situated at the rear of the picture.

Reference is to be had to the accompanying drawings forming a part of this application, in which like reference characters have similar meanings in all of the views, and in which, Figure 1 is an elevational view in crosssection of one of the projection screens.

Figure 2 is a front elevational view of the screen.

Figure 3 is an elevational view, partly in cross-section, showing the entire projection system.

Many arrangements of projection screens coacting with projectors were illustrated in the above mentioned application.

The invention is dependent upon the fact that when a beam of plane polarized light strikes a glass or other surface at the polarizing angle it will be either totally reflected or totally refracted, depending upon the plane in which it is polarized. The projector light is accordingly polarized in such plane that it is reflected by the surfaces 4 of the ridges in the projection screen of Figure 1. The surfaces of these ridges are so slanted that they meet ray 7 coming from the projector at the polarizing angle. The projector light is therefore reflected. All other light passes through the screen body 1, and is absorbed by absorbing means such as a coat of black paint 2, or by means of black velvet 3.

The present application provides in addition to the above mentioned application in addition to the slanting surface 4, a vertical surface 5 which is provided with light diffusing means, such as a ground surface, or a white painted surface. Thus the light 7 coming from the projector is reflected by the slanting surface 4 in such manner that it strikes the vertical light diffusing surface 5, with the result that there is a desirable scattering of the light to the various portions of the hall, so that all may observe it, no matter where located. Figure 2 shows the front appearance of such a screen. The ridges are of course made sufficiently fine as not to interfere with the proper projection of the pictures from the observer's standpoint. The floor should be provided with a light absorbing means 6, such as a black rug, black paint or the like. This is to prevent the reflection of light upward to be scattered by the light diffusing surface 5. The ceiling over this portion may also be provided with a similar light diffusing absorbent. The absorbents need not extend very far away from the screen, as the greatest danger of the disturbance is in the immediate neighborhood of the screen itself. The high lights of the projected image will therefore appear in the form of a diffused white light which will be visible from all parts of the theatre. There will thus not be a tendency for all of the light to be reflected in a uniform direction from the surface of the screen.

Figure 3 is a view of the whole projection system. The screen is shown to have a spherical form, as this is a great aid to the projection of stereoscopic pictures, and also in giving a satisfactory view to those seated to one side of the projection screen, as it takes the flat distortion out of the pictures. The polarizing means is not shown in conjunction with the arc 10, condenser 9, film 8 and lens 7.

It is desirable to use a suitable reflector 11 in the projector when polarized light is used, as the light which it reflects may also be polarized, and thus further aid in the production of bright images in daylight. A bundle of fine glass plates, which is a very convenient means for polarizing light, is shown at 8ª in Fig. 3.

Having described my invention, I claim as new and desire to secure Letters Patent for:

1. A projection screen having a ridged surface composed of two series of alternately spaced planes, one series of planes being inclined at the polarizing angle to the incident projector light and the other series of planes being disposed at right angles to the plane of the screen and being of a light diffusing nature, the series of planes at the polarizing angle acting upon the projector light to reflect it and cause it to impinge upon the series of planes disposed at right angles which further reflects and diffuses said projector light.

2. A projection screen provided with a series of ridges, each of said ridges having a surface which is inclined at the polarizing angle to light striking said screen at a right angle to the plane of said screen in order to reflect said light so that it impinges on a vertical surface of the adjacent ridge which is coated with light diffusing substances in order to diffuse said light.

3. A projection screen consisting of a ridged surface, each of said ridges having a slanting surface at the polarizing angle, and a vertical light diffusing surface the rear surface of said screen being provided with light absorbing means.

4. The process of projecting daylight pictures which consists in projecting a beam of plane polarized light upon a screen whose surface is composed of ridges, said ridges having each a surface inclined to the said beam of light at the polarizing angle and also a surface which is light diffusing and situated at right angles to the plane of said screen, said surface inclined at polarizing angle acting to reflect said beam of light upon the said light diffusing surface of an adjacent ridge so that said beam of light is diffused.

Pittston, Pa., December 14, 1926.

ALOYSIUS J. CAWLEY.